United States Patent [19]

Musch et al.

[11] Patent Number: 4,737,528

[45] Date of Patent: Apr. 12, 1988

[54] VULCANIZABLE POLYMER MIXTURES, THEIR PRODUCTION AND USE AND VULCANIZATES OBTAINED THEREFROM

[75] Inventors: Rüdiger Musch, Bergisch-Gladbach; Wilhelm Göbel, Leverkusen; Jean Mirza, Odenthal-Gloebusch, all of Fed. Rep. of Germany

[73] Assignee: Bayer Aktiengesellschaft, Leverkusen-Bayerwerk, Fed. Rep. of Germany

[21] Appl. No.: 921,113

[22] Filed: Oct. 21, 1986

[30] Foreign Application Priority Data

Nov. 2, 1985 [DE] Fed. Rep. of Germany ....... 3538869

[51] Int. Cl.4 .......................... C08J 3/16; C08L 27/04
[52] U.S. Cl. .................................. 523/335; 525/215; 525/235
[58] Field of Search ................. 525/215, 235; 523/335

[56] References Cited

U.S. PATENT DOCUMENTS

| 2,160,997 | 6/1939 | Wiezevich . | |
| 3,452,120 | 6/1969 | Arnold | 525/215 |
| 3,494,784 | 2/1970 | Coene et al. | 525/215 |
| 4,593,062 | 6/1986 | Puydak et al. | 525/215 |

OTHER PUBLICATIONS

Journal of Polymer Science, vol. 18, No. 5, May 1980, pp. 1523–1537, John Wiley & Sons, Inc., New York, U.S.

Primary Examiner—Jacob Ziegler
Attorney, Agent, or Firm—Connolly & Hutz

[57] ABSTRACT

Polychloroprene rubbers having favorable processing behavior and excellent properties are obtained if mono-, di- or trichlorosubstituted polyisobutylene is added as plasticizer before vulcanization.

10 Claims, No Drawings

VULCANIZABLE POLYMER MIXTURES, THEIR PRODUCTION AND USE AND VULCANIZATES OBTAINED THEREFROM

This invention relates to vulcanizable polymer mixtures of (a) a polychloroprene, (b) a mono-, di- or trichlorosubstituted polyisobutylene and, optionally, other constituents, to their production by mixing corresponding latices, coagulation and working up or by mixing the constituents in solid form, to their use for the production of vulcanized moldings and to the vulcanizates obtained.

Polychloroprene rubbers are having to meet increasing quality requirements. Types having good processing behavior are required for numerous applications. One particular requirement is that the absorption of energy during preparation of the mixture should be minimal so that the material does not heat up and is safer to process. In addition, there is a need to improve resistance to swelling in water or water-containing media.

It is known that, in the main, plasticizers based on mineral oils are used for improving processibility in polychloroprene. Naphthenic processing oils of relatively low molecular weight are primarily used because they are easy to incorporate. However, they show relatively high volatility during aging in hot air, tend to exude when incorporated in large amounts and discolor light mixtures.

Accordingly, the object of the present invention is to provide products in which none of the disadvantages mentioned above arises.

According to the invention, this object is achieved by preparing mixtures of polychloroprene and mono-, di- or trichlorosubstituted polyisobutylene.

Accordingly, the present invention relates to vulcanizable polymer mixtures of (a) from 99 to 45% by weight polychloroprene and (b) from 1 to 55% by weight mono-, di- or trichlorosubstituted polyisobutylene, the percentages being based on the sum of (a) and (b), and optionally other compounding ingredients.

The polymer mixtures preferably contain from 95 to 70% by weight polychloroprene and from 5 to 30% by weight chlorosubstituted polyisobutylene.

In the context of the invention, polychloroprene is understood to be chloroprene homopolymers and copolymers of which up to 50% by weight may be pre-crosslinked. The copolymers may contain up to 20% by weight comonomers, suitable comonomers being, for example 1-chlorobutadiene, 2,3-dichlorobutadiene, styrene, isoprene, acrylonitrile, acrylates and methacrylic acid or sulfur and—in the case of pre-crosslinked products—divinylbenzene or ethylene glycol dimethacrylate. The molecular weight of the polymer formed is controlled by addition of sulfur-containing organic chain-transfer agents, such as mercaptans, or—in the case of chloroprene-sulfur copolymers—by a following peptization step.

Preferred chloroprene polymers contain from 0 to 10% by weight 2,3-dichlorobutadiene or from 0 to 1% by weight sulfur.

The chlorine atoms of the polyisobutylene are at the end of the chain. These products are obtained by cationic polymerization using the inifer method (U.S. Pat. No. 4,327,201 and J. P. Kennedy et al in J. Polym. Sci. Polymer Chem. Ed 18 1523 (1980) and in Polymer Bul. 1 575 (1979) and 4, 67 (1981)).

Preferred chloro-substituted polyisobutylenes are those obtained by polymerization of isobutylene using a metal halide boiling below 50° C. at normal pressure as catalyst and an organic halide corresponding to the following general formula

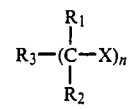

in which
X is halogen,
n is an integer of 1, 2, 3 or 4,
$R_1$ and $R_2$ represent $C_5$–$C_{10}$ cycloalkyl or linear or branched $C_1$–$C_{20}$ alkyl and
$R_3$ represents $C_5$–$C_{10}$ cycloalkyl, linear or branched $C_1$–$C_{20}$ alkyl, $C_5$–$C_{10}$ cycloalkylene, linear or branched $C_1$–$C_{20}$ alkylene or aryl,
the organic halide (inifer) containing from 5 to 50 carbon atoms and being present in concentrations of from $10^{-1}$ to $10^{-6}$ moles per mole monomer, while the metal halide is added in a 1.1 to 100-fold molar excess, based on halogen atoms in the organic halide, in an inert organic solvent at temperatures of from +10° to −130° C.

Trifunctional polyisobutylenes are preferred.

If the polymers are to be mixed at the latex stage, an aqueous suspension is first prepared from the polyisobutylene, for example in accordance with Houben-Weyl, Vol. 1/2 (1959), pages 67 and 97 et seq., Thieme-Verlag Stuttgart, or F. Holcher, Dispersionen synthetischer Hochpolymerer (1969), Springer-Verlag, and mixed with the polychloroprene latex. The pH of the alkaline latex mixture is then lowered to pH 5–7 by addition of dilute acetic acid and the polymer isolated from this emulsion, for example by low-temperature coagulation, and dried (Chem. Engng. Progr. 43, 391 (1974), DE-PS No. 1 051 506). However, other conventional methods, for example the method described in DE-PS No. 1 111 804, are also suitable for working up.

Suitable polychloroprenes have a Mooney viscosity ML 1+4 (100° C.) of from 20 to 160 MU and preferably of from 30 to 140 MU. The molecular weights of the polyisobutylenes used are determined by GPC and are in the range of from 500 to 200,000 and preferably in the range of from 1000 to 30,000.

Other suitable mixture constituents are, for example, carbon black, light fillers, lubricants, optionally other plasticizers, antioxidants, zinc oxide, magnesium oxide, vulcanization accelerators and sulfur.

EXAMPLES

(A) Preparation of the polychloroprene 3.5 kg of the sodium salt of disproportionated abietic acid, 0.5 kg of the sodium salt of a naphthalene sulfonic acid/formaldehyde condensate and 0.6 kg sodium hydroxide are dissolved in 120 kg water. 90 kg chloroprene and 0.156 kg n-dodecylmercaptan are emulsified in this solution. The emulsion is purged with nitrogen, heated to +45° C. and polymerization carried out by continuous addition of 3% by weight aqueous formamidine sulfinic acid. The polymerization temperature is kept at +45° C. The reaction is stopped at a monomer conversion of 60% by addition of 90 g phenothiazine. The residual monomer is removed from the polymer by steam distillation and, after the pH-valve has been reduced to 7.0, the polymer latex is frozen on a cooling roller and isolated. The Mooney viscosity ML 1+4, 100° C., is 32 MU.

(B) Preparation of polyisobutylene containing 2 tert.-Cl terminal groups

Experimental conditions
Dicumylchloride: $1.8 \times 10^{-3}$ mole/l
Isobutene: 0.07 mole/l
Solvent: methylene chloride
Reaction temperature: −80° C.
Reaction time: 30 minutes
$BCl_3$: 0.2 mole/l Polymerization was carried out by dissolving isobutene and dicumylchloride in methylene chloride, cooling the mixture to −80° C. and adding $BCl_3$. Polymerization was carried out and the products worked up in accordance with Makromol. Chem. 184, 553–662 (1983). The product had a molecular weight of 3400 as determined by GPC.

(C) Preparation of polyisobutylene containing 3 tert.-Cl terminal groups

The procedure is as in Example (B), except that the dicumylchloride is replaced by $1.8 \times 10^{-3}$ mole/l tricumylchloride (1,3,5-tris-1-chloro-1-methylethyl)benzene. The product had a molecular weight of 3600 as determined by GPC.

Polymers A-C are then mixed with the following components in the usual way on mixing rolls:

Mixture constituents
Polyisobutylene (B/C): 0–30 parts by weight
Polychloroprene (A): 100 parts by weight
Inactive carbon black: 75 parts by weight
Plasticizer: 0–30 parts by weight
Stearic acid: 0–5 part by weight
Phenyl-β-naphthylamine: 3.0 parts by weight
Magnesium oxide: 4.0 parts by weight
Zinc oxide: 5.0 parts by weight
Ethylene thiourea: 0.5 part by weight

EXAMPLE 1

Temperature of the polymer mixture

The components are mixed for 18 minutes on mixing rolls heated to 40° C. The temperature of the vulcanizate mixture is then determined.

| Example | 1a[1] | 1b | 1c[1] | 1d | 1e[1] |
|---|---|---|---|---|---|
| Polymer A (parts by weight) | 100 | 100 | 100 | 100 | 100 |
| Polymer B (parts by weight) | 0 | 7.5 | 0 | 15 | 0 |
| Plasticizer (parts by weight) | 0 | 0 | 7.5 | 0 | 15 |
| Temperature of the final mixture (°C.) | 78 | 66 | 70 | 64 | 70 |

[1]Comparison Example

EXAMPLE 2

Vulcanization behavior

The carbon black mixture is tested for its Vulcanization behavior in a Bayer-Frank Vulkameter at 150° C. and at 170° C. (DIN 53 529):

| Example | 2a | 2b | 2c[1] |
|---|---|---|---|
| Polymer | | | |
| A | 100 | 100 | 100 |
| B | 30 | — | — |
| C | — | 30 | — |
| Plasticizer | — | — | 30 |
| 150° C. | | | |
| $t_R$ ($t_{10}/t_{80}$) (mins.) | 16 | 17 | 23 |
| $TS_{MAX}$ (N) | 42 | 43 | 38 |
| 170° C. | | | |
| $t_R$ (mins.) | 6 | 7 | 11 |
| $TS_{MAX}$ (N) | 45 | 48 | 32 |

[1]Comparison Example

These test results reveal a considerable technological advantage of the polymer mixture according to the invention because full vulcanization takes place more quickly at a lower batch temperature (Example 1b, 1d). (Example 2a, 2b). This also results in an advantageous, higher crosslinking density of the vulcanizates ($TS_{MAX}$).

EXAMPLE 3

Hot-air aging of the vulcanizate

Testing in accordance with ISO-specification 2475-1975 (E).
Vulcanization temperature: 150° C.
Heating time: 40 mins. (ring I)
Tests: TS, BE, M 100/300% (DIN 53 504) H (20/70° C.) (DIN 53 505).
TS=tensile strength; BE=elongation at break,
M=modulus; H=hardness (shore A).

The vulcanizates prepared in accordance with Example 2 are left for 10 days at 100° C. and the vulcanizate values subsequently remeasured. The differences in relation to the starting values are shown in % in the following Table.

| Example | | 3a | 3b | 3c[1] |
|---|---|---|---|---|
| Vulcanizate of Example | | 2a | 2b | 2c |
| TS reduction | (%) | 12 | 10 | 14 |
| BE reduction | (%) | 38 | 36 | 41 |
| M increase | (%) | 63 | 66 | 118 |
| H increase | (%) | 6 | 6 | 14 |

[1]Comparison Example

EXAMPLE 4

Extraction of the vulcanized samples

The test specimens prepared in accordance with Example 2 are size-reduced and, in quantities of 20 g, are extracted with hexane for 70 hours in a Soxhlet apparatus. The test specimens are then dried again and the weight loss determined.

| Example | 4a | 4b | 4c[1] | 4d[1] |
|---|---|---|---|---|
| Vulcanizate of Example | 2a | 2b | 2c | 1a |
| Weight loss after extraction (%) | 5.6 | 5.8 | 20.5 | 4.9 |

[1]Comparison Example

As the Examples show, the polymer mixture according to the invention cannot be extracted (Example 4a, b) and corresponds to a plasticizer-free polychlorprene (Example 4d).

We claim:

1. Vulcanizable polymer mixtures comprising (a) from 99 to 45% by weight polychloroprene and (b) from 1 to 55% by weight mono-, di- or tri-chlorosubstituted polyisobutylene, the percentages being based on the sum of (a) and (b).

2. Vulcanizable polymer mixtures as claimed in claim 1 of from 95 to 70% by weight (a) and from 5 to 30% by weight (b).

3. Vulcanizable polymer mixtures as claimed in claim 1, characterized in that the polychloroprene has a Mooney viscosity ML 1+4 (100° C.) of from 20 to 160 MU while the polyisobutylene has a molecular weight as determined by GPC of from 500 to 200,000.

4. Vulcanizable polymer mixtures as claimed in claim 1, characterized in that the polychloroprene is a chloroprene homopolymer or copolymer, of which up to 50% by weight is pre-crosslinked, the copolymers containing up to 20% by weight of comonomers.

5. Vulcanizable polymer mixtures as claimed in claim 4, characterized in that the polychloroprene contains from 0 to 10% by weight 2,3-dichlorobutadiene or from 0 to 1% by weight sulfur.

6. Vulcanizable polymer mixtures as claimed in claim 1, characterized in that the chlorosubstituted polyisobutylene is obtained by polymerization of isobutylene using a metal halide boiling below 50° C. at normal pressure as catalyst and an organic halide corresponding to the following general formula

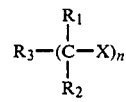

in which
X is halogen,
n is an integer of 1, 2, 3 or 4,
$R_1$ and $R_2$ represent $C_5$–$C_{10}$ cycloalkyl or linear or branched $C_1$–$C_{20}$ alkyl and
$R_3$ represents $C_5$–$C_{10}$ cycloalkyl, linear or branched $C_1$–$C_{20}$ alkyl, $C_5$–$C_{10}$ cycloalkylene, linear or branched $C_1$–$C_{20}$ alkylene or aryl,
the organic halide containing from 5 to 50 carbon atoms and being present in concentrations of from $10^{-1}$ to $10^{-6}$ moles per mole monomer while the metal halide is added in a 1.1- to 100-fold molar excess, based on halogen atoms of the organic halide, in an inert organic solvent at temperatures of from +10° to −130° C.

7. Vulcanizable polymer mixtures as claimed in claim 6, characterized in that n is 3.

8. A process for preparing the polymer mixtures claimed in claim 1, characterized in that components (a) and (b) are mixed together in the form of an aqueous dispersion, the mixture is coagulated and the coagulate is dried or components (a) and (b) are mixed in solid form.

9. A process for the production of moldings from the polymer mixtures claimed in claim 1, characterized in that the polymer mixtures are vulcanized together with a crosslinking agent.

10. Vulcanizates prepared from the polymer mixtures claimed in claim 1.

* * * * *